(12) United States Patent
Griffin et al.

(10) Patent No.: US 8,694,781 B1
(45) Date of Patent: Apr. 8, 2014

(54) TECHNIQUES FOR PROVIDING HARDWARE SECURITY MODULE OPERABILITY

(75) Inventors: Robert W. Griffin, Hollis, NH (US); Joshua A. Rosenthol, Centreville, VA (US)

(73) Assignee: EMC Corporation, Hopkinton, MA (US)

( * ) Notice: Subject to any disclaimer, the term of this patent is extended or adjusted under 35 U.S.C. 154(b) by 15 days.

(21) Appl. No.: 13/435,104

(22) Filed: Mar. 30, 2012

(51) Int. Cl.
*H04L 9/32* (2006.01)
*H04L 29/06* (2006.01)

(52) U.S. Cl.
CPC ..................................... *H04L 63/08* (2013.01)
USPC ............................................. 713/168; 726/2

(58) Field of Classification Search
CPC ............................. H04L 63/08; H04L 63/0428
USPC ........................................ 726/2; 713/168, 194
See application file for complete search history.

(56) References Cited

U.S. PATENT DOCUMENTS

| | | | |
|---|---|---|---|
| 8,176,336 B1 | 5/2012 | Mao et al. | |
| 8,266,676 B2 | 9/2012 | Hardjono et al. | |
| 8,335,931 B2 | 12/2012 | Lee et al. | |
| 8,370,899 B2 | 2/2013 | Shoval et al. | |
| 8,402,557 B2 | 3/2013 | Ginter et al. | |
| 2006/0075252 A1* | 4/2006 | Kallahalla et al. | 713/182 |
| 2008/0244569 A1* | 10/2008 | Challener et al. | 718/1 |
| 2008/0276131 A1* | 11/2008 | Bantz et al. | 714/47 |
| 2010/0268812 A1* | 10/2010 | Mohrmann et al. | 709/224 |
| 2011/0179412 A1* | 7/2011 | Nakae et al. | 718/1 |
| 2012/0266231 A1 | 10/2012 | Spiers et al. | |
| 2013/0067470 A1* | 3/2013 | Chen et al. | 718/1 |
| 2013/0185812 A1 | 7/2013 | Lie et al. | |

* cited by examiner

*Primary Examiner* — Brandon Hoffman
*Assistant Examiner* — Anthony Brown
(74) *Attorney, Agent, or Firm* — BainwoodHuang

(57) ABSTRACT

A technique provides hardware security module (HSM) operability which is performed in a computing device. The technique involves running, by processing circuitry of the computing device, a virtual machine monitor to provide a virtual machine environment. The technique further involves running, by the processing circuitry, a security module VM within the virtual machine environment. The security module VM is configured to perform HSM operations on behalf of a set of other VMs. The technique further involves imposing, by the processing circuitry, a requirement that all access between the security module VM and the set of other VMs occur through the virtual machine monitor to isolate and protect the security module VM against tampering.

20 Claims, 5 Drawing Sheets

TECHNIQUES FOR PROVIDING HARDWARE SECURITY MODULE OPERABILITY

BACKGROUND

A conventional hardware security module (HSM) is a hardware device (e.g., a stand-alone appliance, a PCI card, a USB module, etc.) which electronically connects to a computer system to provide data encryption/decryption services without revealing its encryption/decryption keys. The software running on the computer system typically obtains these encryption/decryption capabilities through an API or network services.

FIPS 140-2 is a standard which defines various security levels (i.e., requirements) for HSMs. For example, an HSM which is provisioned for FIPS 140-2 Security Level 2 may include a tamper-evident coating or seal so that the coating or seal must be broken in order to obtain physical access to the keys/parameters within the HSM. As another example, an HSM which is provisioned for FIPS 140-2 Security Level 3 may include circuitry that "zeroizes" the keys/parameters within the HSM if the HSM is physically opened.

SUMMARY

Unfortunately, there are deficiencies to the above-described conventional HSM. For example, suppose that an HSM is physically plugged into a computer system, and that a virtual machine runs within a virtual environment of the computer system. Further suppose that the virtual machine (or an application running within the virtual machine) relies on access to the HSM for encryption/decryption services. Since the HSM is physically tied to the computer system, the virtual machine (or the application) is unable to move freely across computer systems (e.g., to another computer system for load balancing or fault tolerance) without losing access to the HSM.

As another example, suppose that each virtual machine within a virtual environment of a computer system requires access to its own HSM. In this situation, the number of virtual machines running on the computer system may be limited by the physical limitations of computer system (e.g., the number of HSMs that are able to physically connect to the computer system). Accordingly, the physical limitations constrain the ability of HSMs to support rapid allocation and/or de-allocation of resources within a virtual infrastructure.

In contrast to the above-described conventional HSMs and their associated limitations (e.g., inability to move freely in a virtual infrastructure), an improved technique involves providing hardware security module (HSM) operability using a security module virtual machine (VM) which is constructed and arranged to perform HSM operations on behalf of a set of other VMs (i.e., one or more other VMs). With instantiation of such a security module VM and perhaps the ability to move the security module VM freely across a virtual infrastructure, such a security module VM supports rapid allocation and/or de-allocation of resources. Additionally, enhanced provisioning of the virtual environment such as augmenting a virtual machine monitor (VMM) (or hypervisor) to isolate the security module VM and monitor for unpermitted direct access attempts can protect the security module VM in a manner consistent with various FIPS 140-2 levels (e.g., tamper identification, self-destruction in response to tampering, etc.). Furthermore, other mechanisms can be put in place to protect against rogue VMs, malware infected VMs, unauthorized copying and unintended data leakage, and so on.

One embodiment is directed to a method of providing hardware security module (HSM) operability which is performed in a computing device. The method includes running, by processing circuitry of the computing device, a virtual machine monitor to provide a virtual machine environment. The method further includes running, by the processing circuitry, a security module VM within the virtual machine environment. The security module VM is configured to perform HSM operations on behalf of a set of other VMs. The method further includes imposing, by the processing circuitry, a requirement that all access between the security module VM and the set of other VMs occur through the virtual machine monitor to isolate and protect the security module VM against tampering.

In some arrangements, the security module VM is configured to maintain a set of cryptographic keys in the sense of a non-virtual HSM (i.e., an actual hardware device configured to perform HSM operations). In these arrangements, running the security module virtual machine within the virtual machine environment includes inputting first data in unencrypted form from the set of other virtual machines into the security module virtual machine and outputting the first data in encrypted form from the security module virtual machine to the set of other virtual machines, the outputted first data being encrypted by the security module virtual machine using the set of cryptographic keys. The method further includes inputting second data in encrypted form into the security module virtual machine from the set of other virtual machines and outputting the second data in unencrypted form from the security module virtual machine to the set of other virtual machines, the outputted second data being decrypted by the security module virtual machine using the set of cryptographic keys.

In some arrangements, the method further includes running a data loss prevention (DLP) application within the security module VM to prevent exposure of the set of cryptographic keys to the set of other VMs. In these arrangements, the DLP application can be configured to scan or filter for data resembling cryptographic keys, and thus prohibit release of that data to prevent unauthorized key exposure.

In some arrangements, the method further includes running a monitoring VM which monitors computational and input/output (IO) activity of the virtual machine monitor to guard against the virtual machine monitor exposing the set of cryptographic keys from the security module VM. In these arrangements, the presence of the monitoring VM provides the ability to check whether the virtual machine monitor is operating properly or identify whether the virtual machine monitor has been compromised. For example, the monitoring VM can attempt to perform a privileged instruction or directly access memory that belongs to another VM. In these situations, the operations of the monitoring VM should be rejected by the virtual machine monitor, and the virtual machine monitor should provide an alert message.

In some arrangements, the method further includes imposing a requirement that M-of-N human administrators provide approval to unlock access to a security module template prior to instantiating the security module VM from the unlocked security module template to control access to the security module template. In these arrangements, N is the total number of human administrators having administrative access to the virtual machine environment, and M is greater than 1. Accordingly, multiple human administrators are necessary to unlock access to the security module template.

In some arrangements, imposing the requirement that all access between the security module VM and the set of other VMs occur through the virtual machine monitor includes outputting, by the virtual machine monitor, a tamper alert signal in response to detection of an attempt by the set of other VMs to directly access the security module VM rather than access the security module VM through the virtual machine monitor. In these arrangements, the tamper alert signal is capable of providing tamper-evidence along the lines of FIPS 140-2 Security Level 2.

In some arrangements, imposing the requirement that all access between the security module VM and the set of other VMs occur through the virtual machine monitor further includes destroying the security module VM and the security module template in response to the tamper alert signal. In these arrangements, such destruction of the security module VM and the security module template is capable of providing tamper-resistance along the lines of FIPS 140-2 Security Level 3.

Other embodiments are directed to systems, apparatus, processing circuits, computer program products, and so on. Some embodiments are directed to various methods, electronic components and circuitry which are involved in providing hardware security module (HSM) operability in a computing device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques involve providing hardware security module (HSM) operability using security module virtual machines (VMs) which are constructed and arranged to perform HSM operations on behalf of other VMs. With instantiation of such a security module VM and perhaps the ability to move the security module VM freely across a virtual infrastructure, such a security module VM supports rapid allocation and/or de-allocation of resources. Additionally, enhanced provisioning of the virtual environment such as augmenting a virtual machine monitor (VMM) (or hypervisor) to isolate a security module VM and monitor for unpermitted direct access attempts can protect the security module VM in a manner consistent with various FIPS 140-2 levels (e.g., tamper identification, self-destruction in response to tampering, etc.). Furthermore, other mechanisms can be put in place to protect against rogue VMs, malware infected VMs, unauthorized copying and unintended data leakage, and so on.

Figure 1:
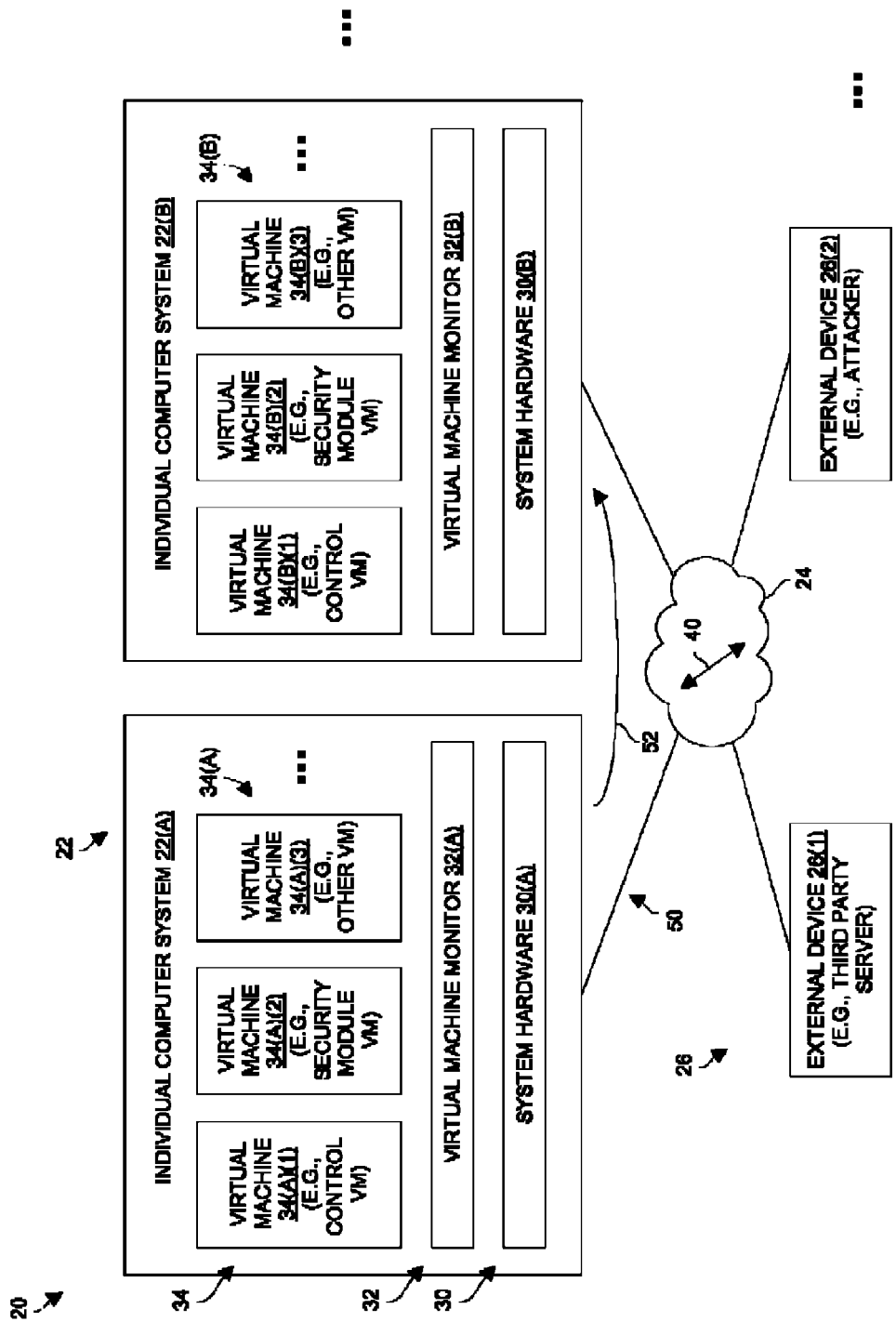
FIG. 1 is a block diagram of an electronic environment which is suitable for providing hardware security module (HSM) operability in a computing device.

FIG. 1 shows an electronic environment 20 which is suitable for providing HSM operability, but which is not limited to the physical properties of a conventional hardware device (i.e., a conventional non-virtual HSM). The electronic environment 20 includes individual computer systems 22(A), 22(B), . . . (collectively, computer systems 22), and a communications medium 24. The electronic environment 20 may further include external devices 26. By way of example only, the external device 26(1) represents a third party server, and the external device 26(2) represents a malicious attacker.

Each computer system 22 includes specially configured underlying system hardware 30 which forms a VMM 32, and a set of VMs 34. In particular, the computer system 22(A) includes system hardware 30(A) which forms a VMM 32(A) and a set of VMs 34(A). For illustration purposes, the VM 34(A)(1) is a control VM, the VM 34(A)(2) is a security module VM, and the VM 34(A)(3) is simply another VM (e.g., a VM running a set of applications to perform useful work). Similarly, the computer system 22(B) includes system hardware 30(B) which forms a VMM 32(B) and a set of VMs 34(B).

The communications medium 24 connects the various components of the electronic environment 20 together to enable these components to exchange electronic signals 40 (e.g., see the double arrow 40). At least a portion of the communications medium 24 is illustrated as a cloud to indicate that the communications medium 24 is capable of having a variety of different topologies including backbone, hub-and-spoke, loop, irregular, combinations thereof, and so on. Along these lines, the communications medium 24 may include copper-based devices and cabling, fiber optic devices and cabling, wireless devices, combinations thereof, etc.

During operation, each computer system 22 runs at least one local security module VM 34 to perform HSM operations on behalf of one or more other VMs 34. For example, suppose that the virtual machine 34(A)(3) requires encryption/decryption services that would be typically provided by an actual physical HSM device. Rather than configure the virtual machine 34(A)(3) to rely on such a physical HSM device and be tied to the physical properties associated with that physical HSM device, the virtual machine 34(A)(3) is able to obtain HSM services from the security module VM 34(A)(2). In this manner, the virtual machine 34(A)(3) (and perhaps other VMs 34 running on the computer system 22(A)) are able to enjoy rapid deployment of the security module VM 34(A)(2), e.g., dynamic instantiation of the security module VM 34(A)(2) at the same time the other VM 34(A)(3) is instantiated. Similarly, the resources of the security module VM 34(A)(2) can be de-allocated at the same time the resources of the virtual machine 34(A)(3) are de-allocated. Accordingly, such resource utilization is free of certain physical limitations of the computer system 22(A) such as the number of physical HSM devices that can physically connect to the computer system 22(A) at any one time.

Moreover and as will be explained in further detail shortly, the VM 34(A)(3) is capable of moving within a cohesive virtual infrastructure 50 formed by multiple computer systems 22. For example, the VM 34(A)(3) is capable of migrating from the computer system 22(A) to the computer system 22(B) for fault tolerance or load balancing purposes (see arrow 52 in FIG. 1). Similarly, workloads (e.g., sets of applications running in the VM 34(A)(3), sets of VMs 34, etc.) can migrate from the computer system 22(A) to the computer system 22(B) (i.e., live migration of workloads). During such migration, the migrating VMs 34 are able to maintain access to security module VM 34s in order to keep full operability. Along these lines, the security module VM 34 is able to migrate concurrently and/or transfer support to another security module VM 34 on another computer system 22. Migration in the opposite direction (i.e., from the computer system 22(B) to the computer system 22(A)) is available as well.

It should be understood that before the security module VMs 34 are instantiated and throughout the operation of the security module VMs 34 after instantiation, the virtual infrastructure 50 operates to maintain isolation of the security module VMs 34 (and their initial images) and thus protect the contents of the security module VMs 34, e.g., to prevent exposure of plaintext cryptographic keys, critical security parameters (CSPs), other secrets, etc. Along these lines, the VMMs 32 impose a requirement that all communications with the security module VMs 34 pass through the VMMs 32 (e.g., as API calls to the VMMs 32). Additionally, the VMMs 32 monitor for unauthorized code execution and IOs that attempt to cross VM boundaries (e.g., an attempt to read the memory of another VM 34). Additional restrictions include authentication of applications and VMs 34 that move across computer systems 22 (e.g., certificate exchanging and verification), special monitoring VMs 34, the imposition of M-of-N access administration policies, and the imposition of FIPS 140-2 Security Levels. Further details will now be provided with reference to FIG. 2.

Figure 2:
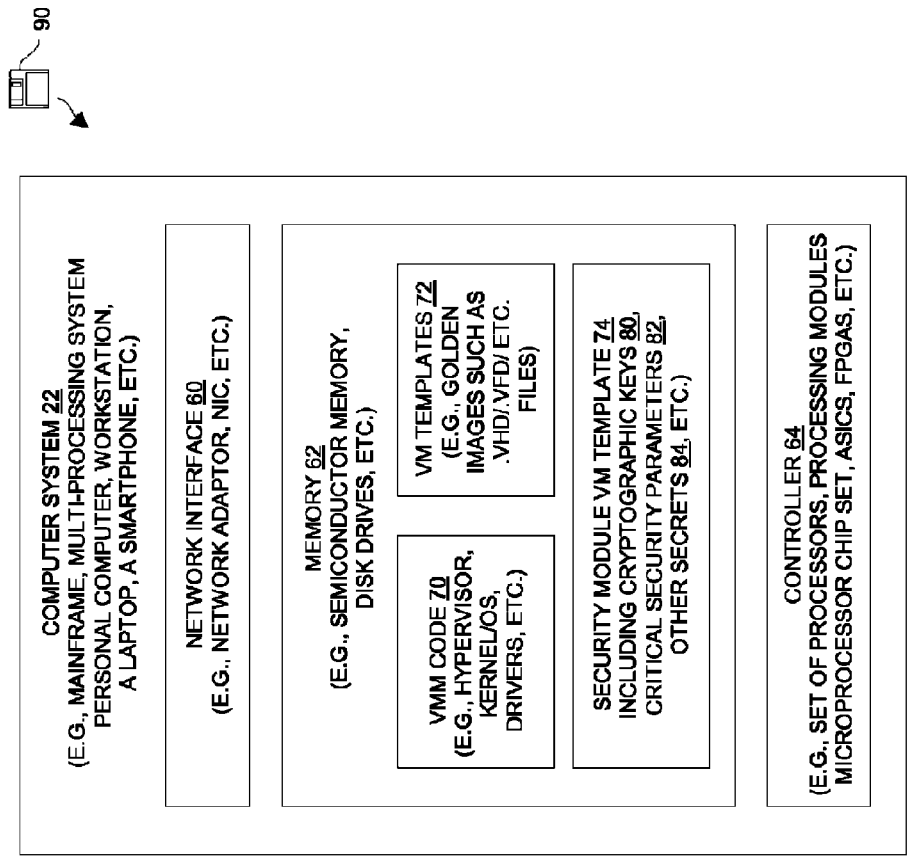
FIG. 2 is a block diagram of a computing device of the electronic environment of FIG. 1.

FIG. 2 shows particular details of the underlying system hardware 30 of a computer system 22 of the electronic environment 20 of FIG. 1. The computer system 22 may take a variety of different forms such as a mainframe, a multi-processing system, a personal computer, a workstation, a laptop, a smart phone, or similar type of computing device.

The computer system 22 includes a network interface 60, memory 62, and a controller 64. The computer system 22 may include additional hardware such as a user interface (e.g., a keyboard, a pointer, a display, etc.), peripherals, and so on.

The network interface 60 is constructed and arranged to connect the computer system 22 to the communications medium 24 (also see FIG. 1) and thus enables the computer system 22 to communicate with other devices such as other computer systems 22 forming a cohesive virtual environment 50 (FIG. 1) and external devices 26. In some arrangements, the network interface 60 is implemented in the form of a network card or a network adapter module. In some arrangements, the network interface 60 includes a wireless transceiver for wireless communications.

The memory 62 includes volatile storage (e.g., fast semiconductor memory, cache memory, etc.) and non-volatile storage (e.g., magnetic disk drive memory, flash memory, storage arrays, etc.). The memory 62 stores, among other things, VMM code 70 (e.g., hypervisor code, a kernel or OS, drivers, etc.), VM templates 72 (e.g., golden images such as .VHD and VFD files, etc.), and a security module template 74. As will be explained in further detail shortly, the security module template 74 includes cryptographic keys 80, critical security parameters 82, other secrets 84, etc.) and access to the security module template 74 is securely protected (e.g., requires M-of-N administrative permissions to access).

The controller 64 of the computer system 22 executes the various memory constructs 70, 72, 74 stored in the memory 62 to form a VMM 32 and a set of VMs 34 (also see FIG. 1). It should be understood that the controller 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 90 is capable of delivering all or portions of the software to the computer system 22. The computer program product 90 has a non-transitory (or non-volatile) computer readable medium which stores a set of instructions which controls one or more operations of the computer system 22. Examples of suitable computer readable storage media include tangible articles of manufacture and apparatus which store instructions in a non-volatile manner such as CD-ROM, flash memory, disk memory, tape memory, and the like.

During operation, the controller 64 forms the VMM 32 when executing the VMM code 70. In some arrangements, the computer system 64 has an "OS hosted" configuration in which the VMM (or hypervisor) runs over an existing general purpose operating system. In other arrangements, the computer system 64 has a "non-OS hosted" configuration in which a kernel customized to support virtual machines takes the place of a general purpose operating system.

Additionally, the controller 64 further forms the security module VM 34 using the security module template 74. In particular, the security module template 74 is the VM image on which the security module VM 34 is based (e.g., a .VHD or VFD file).

Furthermore, the controller 64 forms other VMs 34 based on the other VM templates 72. These other VMs 34 may, during their operation, obtain HSM services from the security module VM 34 via API calls or network services through the VMM 32. Moreover, various security mechanisms are in place to prevent exposure of secrets (e.g., keys 80, CSPs 82, other secrets 84, etc.) within the security module VM 34 in a manner analogous to that of a conventional hardware security module. Further details will now be provided with reference to FIGS. 3 and 4.

Figure 3:
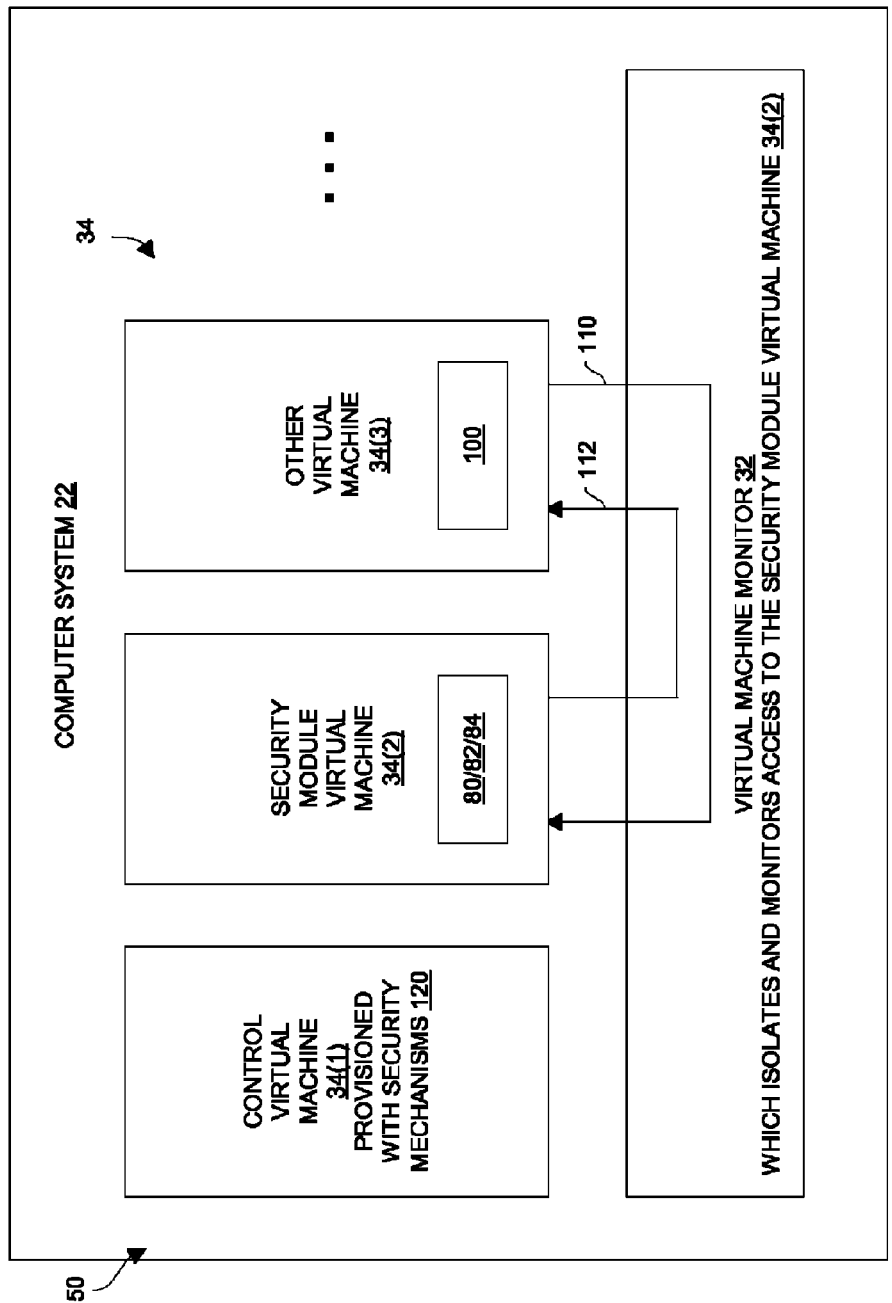
FIG. 3 is a block diagram illustrating certain operations of the computing device of FIG. 2.
Figure 4:
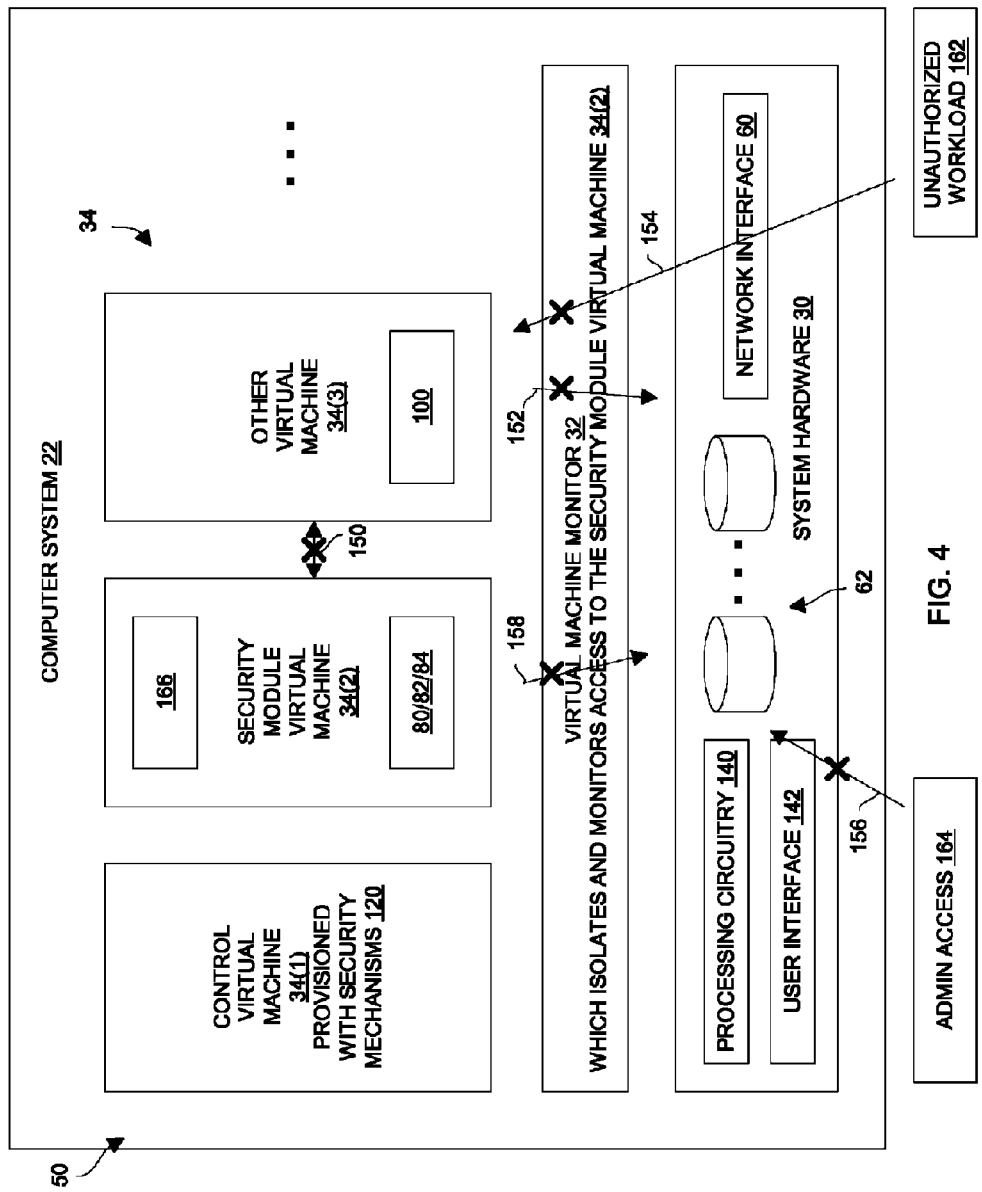
FIG. 4 is a block diagram illustrating certain types of attacks that are protected against in the computing device of FIG. 2.

FIGS. 3 and 4 show particular details of an example virtual environment 50 provided by a computer system 22 (also see FIG. 1). FIG. 3 illustrates details of an HSM operation which is performed securely by a security module VM 34(2). FIG. 4 illustrates particular types of attacks that are protected against during operation of the computer system 22. It should be understood that the underlying system hardware 30 is omitted in FIG. 3 for simplicity. Nevertheless, it should be understood that the virtual infrastructure 50 is ultimately provided by the system hardware 30 using the various software constructs 70, 72, 74 explained earlier (also see FIG. 2).

During operation, suppose that the VMM 32 and the control VM 34(1) are initially running on the computer system 22. Further suppose that the need arises to instantiate another VM 34 which is equipped with access to HSM services. Perhaps the other VM 34 must run an application 100 which requires encryption or decryption of a file (or other data). To fulfill this need, the control VM 34(1) instantiates the security module VM 34(2) and the other VM 34(3), i.e., rapid allocation of resources.

Once the security module VM 34(2) and the other VM 34(3) are in operation, the other VM 34(3) is capable of running the application 100. Additionally, the security module VM 34(2) stands ready to provide encryption/decryption services to the other VM 34(3) as if the VM 34(3) had access to an actual non-virtual HSM device. Along these lines, the security module VM 34(2) is configured to utilize cryptographic keys 80, critical security parameters 82, other secrets 84, etc. (also see FIG. 2) in a manner similar to that of an actual non-virtual HSM device.

To encrypt or decrypt a file (or other data), the VM 34(3) makes an API call (or network service call) to the VMM 32. In contrast, in a conventional situation, such a call would be to an interface of an actual non-virtual HSM device (or to an operating system). However, since the VM 34(3) makes a call to the VMM 32, the VMM 32 is able to control communication to the security module VM 34(2) thus maintaining isolation of the security module VM 34(2) as if the security module VM 34(2) where are an actual tamper-guarded hardware device.

The call from the VM 34(3) is illustrated in FIG. 3 by the arrow 110. Here, the call may involve an encryption or decryption command and a file (or other data).

The security module VM 34(2) responds to the call by performing an HSM operation based on the encryption or decryption command. In particular, the security module VM 34(2) cryptographically processes the file (or other data) using the cryptographic keys 80, critical security parameters 82, other secrets 84, and so on.

Ultimately, the security module VM 34(2) provides, as an output, a response 112 to the call. As shown in FIG. 3, the communication again passes through the VMM 32. That is, the security module VM 34(2) returns the response 112 to the VMM 32. The VMM 32 then provides the response 112 to the VM 34(3).

It should be understood that the security module VM 34(2) and the other VM 34(3) are able to enjoy the flexibility provided by the virtual infrastructure 50. For example, additional resources (e.g., memory, processing cycles, etc.) can be easily allocated to these VMs 32 and/or de-allocate from these VMs 32 dynamically. Additionally, one or both of the VMs 32 may be moved from one computer system 22 to another (e.g., for fault tolerance, for load balancing, etc.). Along these lines, the virtual infrastructure 50 may extend across multiple computer systems 22 which are distributed over great distances (also see FIG. 1).

In all situations, it should be understood that the above-described operation of the VMM 32 enables the VMM 32 to maintain robust and reliable isolation of the security module VM 34(2) for security. In particular, at no time did the VM 34(3) have direct access to the security module VM 34(2). Moreover, as will now be explained in further details and with reference to FIG. 4, the VMM 32 and other mechanisms (e.g., a security feature 120 in the control VM 34(1)) also can monitor code execution and IOs to prevent unauthorized access attempts.

As shown in FIG. 4, the system hardware 30 of the computer system 22 includes, among other things, processing circuitry 140, a user interface 142, a network interface 60, and memory 62 (also see FIG. 2). Nevertheless, the computer system 22 is resistant to a variety of attacks or threats including side channel attacks 150, hacking due to malware or malicious code 152, infiltration of a malicious machine or workload 154, administrative attacks 156 and inadvertent exposure of secrets 158.

In connection with side channel attacks 150, there is a risk that a running VM 34(3) may attempt to cross virtual boundaries and read or change data of another virtual component. To prevent such an attack and to maintain isolation of the security module VM 34(2), all communications with the security module VM 34(2) must pass through the VMM 32. That is, the VMM 32 is the only virtual component that is able to access the security module VM 34(2). Such isolation and protection is achieved by restricting what code can run and what IOs can be performed by each VM 34. In particular, the security module VM 34(2) can only be reached through a VMM API (or hypervisor procedure calls) or a network service call through the VMM 32.

In connection with malware or malicious code 152, it is possible that a VM 34 or the VMM 32 could become infected with malware. The above-described restrictions against side channel attacks provide protection against such malware crossing virtual boundaries. However, in addition, both the VMM 32 as well as the control VM 34(1) monitor code execution activity and IOs within the computer system 22 (also see security mechanism 120 in FIGS. 3 and 4). In these arrangements, both the VMM 32 and the control VM 34(1) are provisioned to require application authentication. Any application that is unable to provide credentials to properly authenticate on the computer system 22 is denied the ability to execute on the processing circuitry 140 of the computer system 22.

Furthermore, both the VMM 32 and the control VM 34(1) are provisioned with an alert mechanism to output a tamper alert signal if code execution or an IO occurs which crosses a virtual component boundary. Accordingly, if either a VM 34 or the VMM 32 becomes infected or somehow turns malicious, the alert mechanism enables the computer system 22 to react and take remedial measures. One remedial measure is for the tamper alert signal to provide evidence of tampering (e.g., FIPS 140-2 Security Level 2) and to initiate some form of enforced lock down or restriction on data movement. Another remedial measure is for the tamper alert signal to automatically destroy the security module VM 34(2) (FIGS. 3 and 4) and/or the security module template 74 (FIG. 2), e.g., FIPS 140-2 Security Level 3.

In connection with possible infiltration of a malicious machine or workload 154, there is a risk that a malicious external device 26 (see the external device 26(2) in FIG. 1) may attempt to place a rogue VM 34 or similar type of workload 162 into the virtual environment 50. For example, the malicious external device 26 may attempt to load a fake security module VM 34(2) onto the computer system 22. To protect against such attempts, the VMM 32 imposes certificate exchanging and verification of digital signatures using public/private key techniques. In particular, migration of a workload must be from an authenticated computer system 22 (e.g., see FIG. 1) or workload migration is denied.

In connection with administrative attacks 156, the computer system 22 is provisioned with a user interface 142 which requires M of N administrator access 164 to authorize access to the security module template 74 (FIG. 2). That is, without collaboration of at least M administrators, users are unable to obtain access to the security module template 74. Such a security mechanism protects the security module template 74 from being read and/or tampered with (e.g., protects against involvement of fewer than M administrator changing a property/parameter/etc.). In some arrangements, M is at least 2 or 3, and N is 3 or greater.

In connection with inadvertent exposure of secrets 158, the security module VM 34(2) is provisioned with data loss prevention (DLP) tools 166 to prevent inadvertent exposure of the cryptographic keys 80, critical security parameters 82, other secrets 84, etc. In some arrangements, not only is such information prevented from escaping the security module VM 34(2), the DLP tools 168 are also constructed and arranged to output a tamper alert signal.

Figure 5:
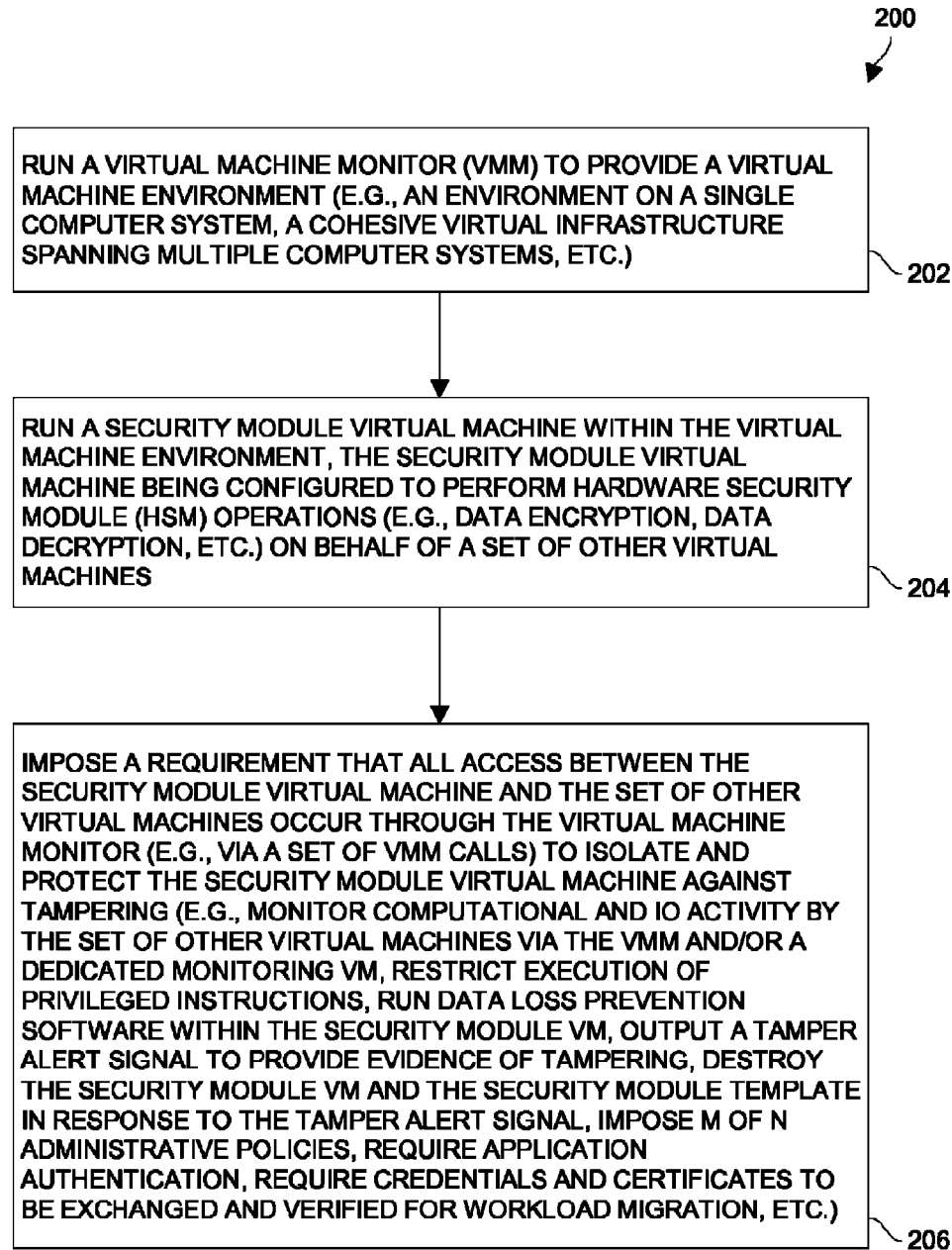
FIG. 5 is a flow chart of a procedure which is performed within the computing device of FIG. 2.

FIG. 5 is a flow chart of a procedure 200 which is performed within the computer system 22. In step 202, the computer system runs a VMM to provide a virtual machine environment. As mentioned earlier in connection with FIGS. 1-4, such a virtual infrastructure may reside on a single computer system 22. Alternatively, such a virtual infrastructure may span multiple computer systems 22.

In step 204, the computer system 22 runs a security module VM within the virtual machine environment. The security module VM is configured to perform HSM operations on behalf of a set of other VMs. Such HSM operations include encrypting data, files, etc. and decrypting data, files, etc. while preventing exposure of the encryption/decryption keys and associated secrets.

In step 206, the computer system 22 imposes a requirement that all access between the security module VM and the set of other VMs occur through the VMM to isolate and protect the security module VM against tampering. As mentioned earlier, such a requirement may be carried out at least in part by the VMM (e.g., restricting communications to the security module VM through the VMM, monitoring code execution and IOs, imposing M of N administrative access policies, requiring authentication of workloads and migrating VMs, etc.). Additionally, such a requirement may be further fulfilled at least in part by the security module VM (e.g., performing DLP, etc.). Also, such a requirement may be further fulfilled at least in part by other VMs such as dedicated monitoring VM or a control VM (e.g., monitoring operation of the VMM, etc.).

As mentioned above, an improved technique involves providing hardware security module (HSM) operability using a security module VM 34 which is constructed and arranged to perform HSM operations on behalf of a set of other VMs 34. With instantiation of such a security module VM 34 and perhaps the ability to move the security module VM 34 freely across a virtual infrastructure 50, such a security module VM 34 supports rapid allocation and/or de-allocation of resources. Additionally, enhanced provisioning of the virtual environment 50 such as augmenting a VMM (or hypervisor) to isolate the security module VM 34 and monitor for unpermitted direct access attempts can protect the security module VM 34 in a manner consistent with various FIPS 140-2 levels (e.g., tamper identification, self-destruction in response to tampering, etc.). Furthermore, other mechanisms can be put in place to protect against rogue VMs, malware infected VMs, unauthorized copying and unintended data leakage, and so on.

While various embodiments of the invention have been particularly shown and described, it will be understood by those skilled in the art that various changes in form and details may be made therein without departing from the spirit and scope of the invention as defined by the appended claims.

For example, a security module VM 34 was described above as providing HSM services locally on a computer system 22. In some arrangements, a security module VM 34 is capable of providing HSM services remotely across computer systems 22. Furthermore, the flexibility of the virtual infrastructure 50 enables the security module VM 34 to move freely across platforms but the various enhancements and augmentations to the virtual infrastructure 50 preserve the fundamental isolation of the cryptographic material and the associated HSM operations.

Additionally, it should be understood that various embodiments were described and illustrated herein primarily as including one or more VMMs 32 that appear as separate entities from other components of the virtualization software. This paradigm for illustrating VMMs is only for the sake of simplicity and clarity and by way of illustration. Differing functional boundaries may be appropriate for differing implementations. In general, functionality and software components/structures described herein can be implemented in any of a variety of appropriate places within the overall structure of the virtualization software (or overall software environment that includes the virtualization software).

With respect to the VMM 32, in view of the above, and without limitation, an interface usually exists between a VM 34 and an underlying platform which is responsible for executing VM-issued instructions and transferring data to and from memory and storage devices or underlying hardware. A VMM 32 may be implemented as a thin piece of software that runs directly on top of a host, or directly on the hardware, and virtualizes at least some of the resources of the physical host machine. The interface exported to the VM 34 is then the same as the hardware interface of a physical machine. In some cases, the interface largely corresponds to the architecture, resources and device complements of the underlying physical hardware; however, in other cases it need not.

Although a VM 34 (and thus applications 100 (e.g., see FIGS. 3 and 4) executing in the VM 34 and their users) cannot usually detect the presence of the VMM 32, the VMM 32 and the VM 34 may be viewed as together forming a single virtual computer. Accordingly, the boundary between VM 34 and VMM 32 may be somewhat arbitrary (although the boundary does exist). For example, while various virtualized hardware components such as virtual CPU(s), virtual memory, virtual disks, and virtual device(s) including virtual timers are presented as part of a VM 34 for the sake of conceptual simplicity, in some virtualization system implementations, these "components" are at least partially implemented as constructs or emulations exposed to the VM 34 by the VMM 32. One advantage of such an arrangement is that the VMM 32 may be set up to expose "generic" devices, which facilitate VM migration and hardware platform-independence. In general, such functionality may be said to exist in the VM 34 or the VMM 32.

It is noted that while VMMs 32 have been illustrated as executing on underlying system hardware, many implementations based on the basic abstraction may be implemented. In particular, some implementations of VMMs 32 (and associated virtual machines) execute in coordination with a kernel that itself executes on underlying system hardware, while other implementations are hosted by an operating system executing on the underlying system hardware 30 and VMMs 32 (and associated virtual machines) executed in coordination with the host operating system.

What is claimed is:

1. In a computing device, a method of providing hardware security module (HSM) operability, the method comprising:

running, by processing circuitry of the computing device, a virtual machine monitor to provide a virtual machine environment;

running, by the processing circuitry, a security module virtual machine within the virtual machine environment, the security module virtual machine being configured to perform HSM operations on behalf of a set of other virtual machines;

imposing, by the processing circuitry, a requirement that all access between the security module virtual machine and the set of other virtual machines occur through the virtual machine monitor to isolate and protect the security module virtual machine against tampering; and imposing, by the processing circuitry, a requirement that M-of-N human administrators provide approval to unlock access to a security module template prior to instantiating the security module virtual machine from the unlocked security module template to control access to the security module template, wherein N is a total number of human administrators having administrative access to the virtual machine environment, and wherein M is greater than 1.

2. A method as in claim 1 wherein the security module virtual machine maintains a set of cryptographic keys; and wherein running the security module virtual machine within the virtual machine environment includes:

inputting first data in unencrypted form from the set of other virtual machines into the security module virtual machine and outputting the first data in encrypted form from the security module virtual machine to the set of other virtual machines, the outputted first data being encrypted by the security module virtual machine using the set of cryptographic keys, and inputting second data in encrypted form into the security module virtual machine from the set of other virtual machines and outputting the second data in unencrypted form from the security module virtual machine to the set of other virtual machines, the outputted second data being decrypted by the security module virtual machine using the set of cryptographic keys.

3. A method as in claim 2 wherein imposing the requirement that all access between the security module virtual machine and the set of other virtual machines occur through the virtual machine monitor includes:

monitoring, by the virtual machine monitor, computational and input/output activity by the set of other virtual machines to guard against exposure of the set of cryptographic keys to the set of other virtual machines.

4. A method as in claim 3, further comprising:
restricting execution of a set of privileged instructions by the set of other virtual machines to prevent the set of other virtual machines from directly accessing the set of cryptographic keys maintained by the security module virtual machine.

5. A method as in claim 3, further comprising:
running a data loss prevention application within the security module virtual machine to prevent exposure of the set of cryptographic keys to the set of other virtual machines.

6. A method as in claim 3, further comprising:
running a monitoring virtual machine which monitors computational and input/output activity of the virtual machine monitor to guard against the virtual machine monitor exposing the set of cryptographic keys from the security module virtual machine.

7. A method as in claim 2 wherein imposing the requirement that all access between the security module virtual machine and the set of other virtual machines occur through the virtual machine monitor includes:

outputting, by the virtual machine monitor, a tamper alert signal in response to detection of an attempt by the set of other virtual machines to directly access the security module virtual machine rather than access the security module virtual machine through the virtual machine monitor.

8. A method as in claim 7 wherein imposing the requirement that all access between the security module virtual machine and the set of other virtual machines occur through the virtual machine monitor further includes:

destroying the security module virtual machine in response to the tamper alert signal.

9. A method as in claim 8 wherein the security module virtual machine is instantiated within the virtual machine environment from a security module template; and wherein imposing the requirement that all access between the security module virtual machine and the set of other virtual machines occur through the virtual machine monitor further includes destroying the security module template in response to the tamper alert signal.

10. In a computing device, a method of providing hardware security module (HSM) operability, the method comprising:

running, by processing circuitry of the computing device, a virtual machine monitor to provide a virtual machine environment;

running, by the processing circuitry, a security module virtual machine within the virtual machine environment, the security module virtual machine being configured to perform HSM operations on behalf of a set of other virtual machines;

imposing, by the processing circuitry, a requirement that all access between the security module virtual machine and the set of other virtual machines occur through the virtual machine monitor to isolate and protect the security module virtual machine against tampering; and imposing a requirement that M-of-N human administrators provide approval to unlock access to a security module template prior to instantiating the security module virtual machine from the unlocked security module template to control access to the security module template, wherein N is a total number of human administrators having administrative access to the virtual machine environment, and wherein M is greater than 1;

wherein the security module virtual machine maintains a set of cryptographic keys; and wherein running the security module virtual machine within the virtual machine environment includes:

inputting first data in unencrypted form from the set of other virtual machines into the security module virtual machine and outputting the first data in encrypted form from the security module virtual machine to the set of other virtual machines, the outputted first data being encrypted by the security module virtual machine using the set of cryptographic keys, and inputting second data in encrypted form into the security module virtual machine from the set of other virtual machines and outputting the second data in unencrypted form from the security module virtual machine to the set of other virtual machines, the outputted second data being decrypted by the security module virtual machine using the set of cryptographic keys.

11. A method as in claim 2, further comprising:
performing, for each application installed within the virtual machine environment, an authentication operation to authentication that application prior to permitting that application to execute within the virtual machine environment to guard against unauthorized application execution.

12. A method as in claim 2, further comprising:
migrating a particular virtual machine to the virtual machine environment from another virtual machine environment, and authenticating the particular virtual machine prior to permitting particular virtual machine to execute within the virtual machine environment to guard against unauthorized virtual machine execution.

13. A computing device which provides hardware security module (HSM) operability, the computing device comprising:

a network interface;
memory; and
processing circuitry coupled to the network interface and the memory; the processing circuitry being constructed and arrange to:
run a virtual machine monitor to provide a virtual machine environment,
run a security module virtual machine within the virtual machine environment, the security module virtual machine being configured to perform HSM operations on behalf of a set of other virtual machines which utilize the network interface and the memory, and impose a requirement that all access between the security module virtual machine and the set of other virtual machines occur through the virtual machine monitor to isolate and protect the security module virtual machine against tampering; and impose a requirement that M-of-N human administrators provide approval to unlock access to a security module template prior to instantiating the security module virtual machine from the unlocked security module template to control access to the security module template, wherein N is a total number of human administrators having administrative access to the virtual machine environment, and wherein M is greater than 1.

14. A computing device as in claim 13 wherein the security module virtual machine maintains a set of cryptographic keys; and wherein the processing circuitry, when running the security module virtual machine within the virtual machine environment, is constructed and arranged to:

input first data in unencrypted form from the set of other virtual machines into the security module virtual machine and output the first data in encrypted form from the security module virtual machine to the set of other virtual machines, the outputted first data being encrypted by the security module virtual machine using the set of cryptographic keys, and input second data in encrypted form into the security module virtual machine from the set of other virtual machines and output the second data in unencrypted form from the security module virtual machine to the set of other virtual machines, the outputted second data being decrypted by the security module virtual machine using the set of cryptographic keys.

15. A computer program product which includes a non-transitory computer readable medium storing a set of instructions to provide hardware security module (HSM) operability, the set of instructions causing computing circuitry to perform a method, comprising:

running, by the computing circuitry, a virtual machine monitor to provide a virtual machine environment;

running, by the computing circuitry, a security module virtual machine within the virtual machine environment, the security module virtual machine being configured to perform HSM operations on behalf of a set of other virtual machines; and imposing, by the computing circuitry, a requirement that all access between the security module virtual machine and the set of other virtual machines occur through the virtual machine monitor to isolate and protect the security module virtual machine against tampering;

imposing, by the computing circuitry, a requirement that M-of-N human administrators provide approval to unlock access to a security module template prior to instantiating the security module virtual machine from the unlocked security module template to control access to the security module template, wherein N is a total number of human administrators having administrative access to the virtual machine environment, and wherein M is greater than 1.

16. A computer program product as in claim 15 wherein the security module virtual machine maintains a set of cryptographic keys; and wherein running the security module virtual machine within the virtual machine environment includes:

inputting first data in unencrypted form from the set of other virtual machines into the security module virtual machine and outputting the first data in encrypted form from the security module virtual machine to the set of other virtual machines, the outputted first data being encrypted by the security module virtual machine using the set of cryptographic keys, and inputting second data in encrypted form into the security module virtual machine from the set of other virtual machines and outputting the second data in unencrypted form from the security module virtual machine to the set of other virtual machines, the outputted second data being decrypted by the security module virtual machine using the set of cryptographic keys.

17. A method as in claim 1 wherein imposing the requirement that all access between the security module virtual machine and the set of other virtual machines occur through the virtual machine monitor includes:

allowing communications with the security module virtual machine only using application programming interface (API) calls through the virtual machine monitor to prevent tampering of the security module virtual machine.

18. A method as in claim 10 wherein imposing the requirement that all access between the security module virtual machine and the set of other virtual machines occur through the virtual machine monitor includes:

allowing communications with the security module virtual machine only using application programming interface (API) calls through the virtual machine monitor to prevent tampering of the security module virtual machine.

19. A computing device as in claim 13 wherein the processing circuitry, when imposing the requirement that all access between the security module virtual machine and the set of other virtual machines occur through the virtual machine monitor, is constructed and arranged to:

allow communications with the security module virtual machine only using application programming interface (API) calls through the virtual machine monitor to prevent tampering of the security module virtual machine.

20. A computer program product as in claim 15 wherein imposing the requirement that all access between the security module virtual machine and the set of other virtual machines occur through the virtual machine monitor includes:

allowing communications with the security module virtual machine only using application programming interface (API) calls through the virtual machine monitor to prevent tampering of the security module virtual machine.

* * * * *